United States Patent [19]

Herrington et al.

[11] Patent Number: 4,952,227

[45] Date of Patent: Aug. 28, 1990

[54] APPARATUS FOR PROCESSING GLASS

[75] Inventors: Richard A. Herrington, Walbridge; Kevin L. Widman, Toledo, both of Ohio; Jeffrey R. Flaugher, Carleton, Mich.; Allan T. Enk, Toledo, Ohio

[73] Assignee: Libbey-Owens-Ford Co., Toledo, Ohio

[21] Appl. No.: 355,169

[22] Filed: May 22, 1989

[51] Int. Cl.$^5$ ............................................. C03B 23/03
[52] U.S. Cl. ........................................ 65/162; 65/163; 65/273
[58] Field of Search ................. 65/104, 106, 273, 291, 65/162, 163

[56] References Cited

U.S. PATENT DOCUMENTS

3,839,000 10/1974 Peternel ............................ 65/106 X
4,364,766 12/1982 Nitschke .......................... 65/163 X Primary Examiner—Joye L. Woodard
Attorney, Agent, or Firm—Marshall & Melhorn

[57] ABSTRACT

An apparatus for processing glass sheets includes a furnace and a bending station traversed by a conveyor for carrying the glass sheets. A plurality of heaters mounted in the furnace each heat associated areas of the glass sheets in accordance with setpoint temperature signals representing desired values of temperatures for heating associated areas of the glass sheets. One or more parameters of the glass sheets, such as thickness and color, are sensed and the setpoint signal values are changed accordingly. The parameter values are also utilized to change the spacing between the upper and lower mold members in the bending station to adjust the bending pressure applied to the glass sheets. Furthermore, the parameters are utilized to change the speed of the conveyor sections in order to vary the time that the glass sheets are in the furnace and thus the amount of heat imparted to the glass sheets.

20 Claims, 5 Drawing Sheets

APPARATUS FOR PROCESSING GLASS

BACKGROUND OF THE INVENTION

The present invention relates generally to an apparatus for processing glass sheets and, in particular, to an apparatus for heating and bending glass sheets.

One process that has been successful in producing bent, tempered sheets of glass, such as are commonly used in glazing closures for automobiles and the like, is the horizontal press bending technique. This technique generally includes heating pretrimmed flat sheets of glass to their softening or bending temperatures by advancing them on a roll conveyor through a heating furnace, bending the heated sheets to a desired curvature or shape between a pair of complementary mold members and then tempering the same by chilling the bent sheets in a controlled manner to a temperature below the annealing range of glass.

It should be appreciated that the glazing closures formed by the above-described process must be bent to precisely defined shapes as dictated by the configuration and size of the openings and the overall styling of the vehicles in which the closures are to be installed.

Moreover, the glazing closures must be properly tempered to increase their resistance to damage resulting from impact and, in the event of breakage, to fragment into relatively small harmless particles as opposed to the large, jagged, potentially dangerous pieces otherwise resulting from untempered glass sheets when broken. Additionally, the bent and tempered glazing closures must meet stringent optical requirements whereby they are free of surface defects and optical distortions that would interfere with clear vision therethrough.

Probably the single most significant factor in meeting all of the above-mentioned requirements resides in heating the sheets to an optimum temperature level during the heating phase to properly condition the glass sheets for further processing. If the heated sheet exits the heating furnace at a relatively cool temperature for example, it will not be sufficiently soft for expedient and proper bending. Moreover, it will not retain the necessary heat required for subsequent tempering. On the other hand, if the sheet leaving the furnace is overheated, it will be extremely pliable with attendant loss of deformation control and will tend to sag out of the desired shape beyond the close tolerances prescribed. Also, overheating tends to degrade the surface quality of the finished product as a result of heat stains, roll marking, pitting and the like. While the optimum temperature range to which the sheets must be heated for satisfactory further processing can be readily calculated, problems are encountered in consistently reaching this desired temperature level and maintaining a multiplicity of glass sheets within such range in a mass production operation. This is due to the inherent, although slight, temperature variations generated by the irregular heat output of the heating elements, whether gas fired or electrical resistance elements, within the furnace and from other extraneous sources which influence the temperature of the heating atmosphere. In any event, it has been found that the temperatures of successive sheets exiting the furnace, as monitored by sophisticated temperature measuring devices, varies frequently and sometimes from sheet to sheet.

Attempts have been made to solve this problem by varying the thermal input to the heating elements in accordance with glass temperature variations from a desired level. However, these attempts have not been entirely satisfactory because of a lagging heat input response, i.e., a time delay before the adjusted thermal input is adequately reflected in the heating atmosphere and imparted to the advancing glass sheets. Other attempts involve manually adjusting the rate of conveyor speed to compensate for temperature variations. However, it is virtually impossible to manually effect the necessary adjustments accurately in a minimum of time because of human error and/or miscalculations, thus seriously impairing efficiency in a mass production operation. Moreover, the complete concentration and constant surveillance required of the operator contributes significantly to fatigue, further increasing the possibilities of human error and poor judgment.

One attempt to control the temperature of glass sheets is shown in U.S. Pat. No. 4,071,344. This patent shows a method and apparatus for controlling the temperature of glass sheets moving through a furnace by automatically varying the heat exposure time of the sheets in the furnace in accordance with temperature variations from a desired level detected in heated sheets exiting the furnace. The sheets are supported in a substantially horizontal plane and moved in a generally horizontal path through the heating furnace at a preselected rate of speed. The individual temperatures of a given series of the heated glass sheets exiting the furnace are measured and the average temperature deviation of the series of a desired temperatures is determined. The rate of speed of the glass sheets in the furnace is varied in accordance with the amount of deviation of the average temperature from the desired temperature to vary the duration of time the sheets moving through the furnace are exposed to heat and thus varying the duration of speed change in accordance with the amount of deviation of the average temperature from the desired temperature.

SUMMARY OF THE INVENTION

The present invention concerns an apparatus for processing glass sheets including a heating operation and a bending operation. The apparatus is especially useful in the manufacture of laminated glazing closures such as vehicle windshields. The apparatus controls the heating station and the bending station to permit the continuous processing of glass sheets of different thicknesses and compositions.

One or more sensors are utilized to identify each sheet of glass before it enters the furnace at the heating station. The sheet of glass is carried through the furnace on a series of conveyors which are speed controlled to define the heating time. In addition, the final one or more sections of the furnace are provided with a plurality of strip heaters and associated thermocouples each connected to an associated one of a plurality of temperature controllers. The strip heaters extend in the direction of travel of the sheets and are positioned side by side across the width of the furnace. The setpoint temperature of each controller can be adjusted to generate a desired amount of heat in the glass sheet in an associated area. Thus, for example, the sheet can be provided with extra heat in an area in which a relatively large or complex bend will be formed.

In the bending station, the distance between the upper and the lower molds must be adjusted to accommodate sheets of different thicknesses. For example, a sheet of relatively thinner glass requires less pressure than a thicker sheet. The present invention provides means for indexing the male mold member with respect to the closed position of the female mold member to achieve such a pressure differential.

The conveyor section speeds, the temperature controllers and the indexing means can be operated by a computer which also receives the signals from the sheet sensor and actual speed and temperature signals for co-ordinating continuous processing of the glass sheets. Values of setpoint signals for speed, temperature and mold spacing are stored in the computer with reference to identifying parameters of the glass sheets. One or more sensors sense the values of the identifying parameters of the sheets entering the furnace and the computer responds by changing the setpoint values as necessary to process the sheets in order.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
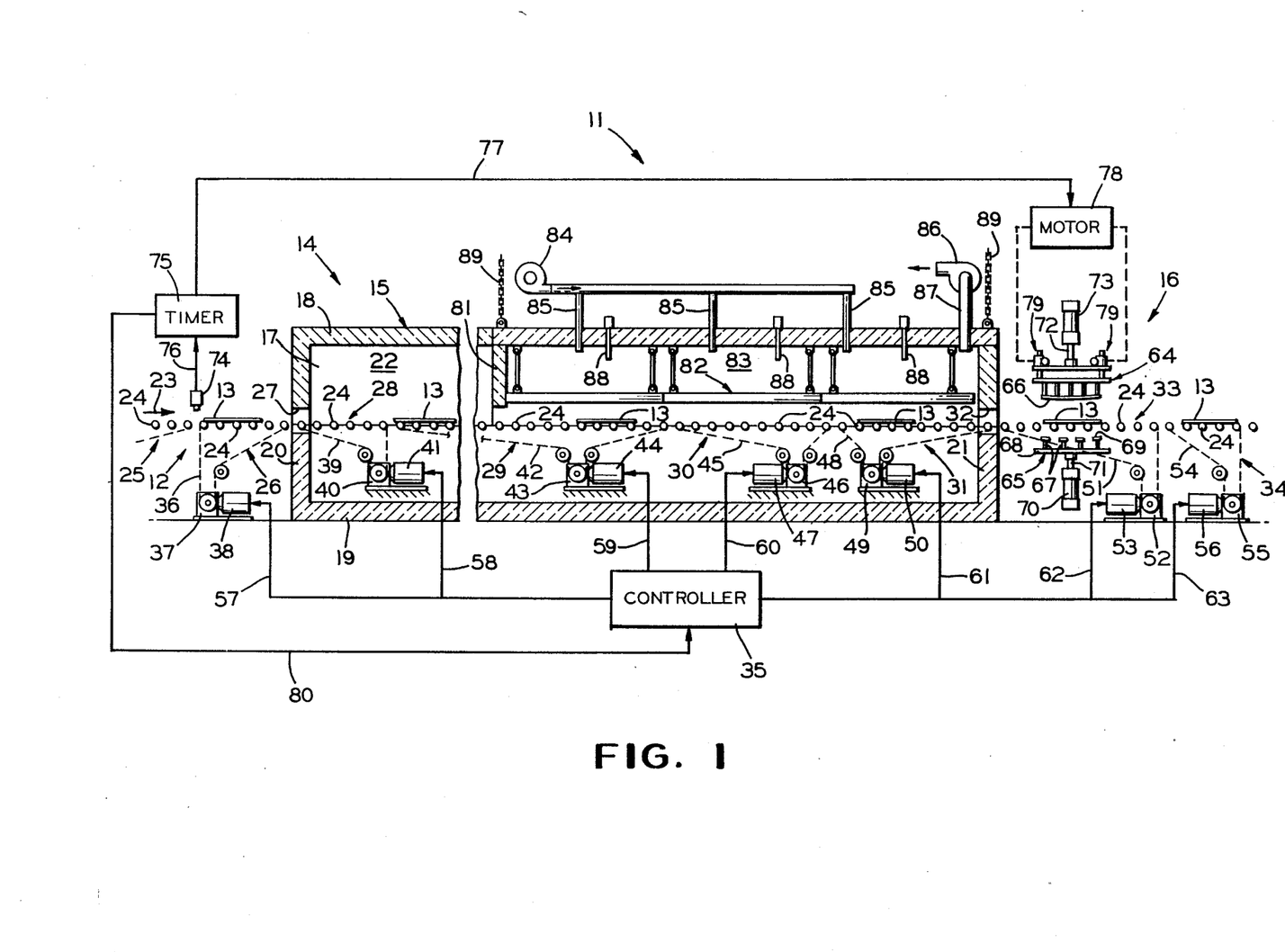
FIG. 1 is a view of a schematic elevational view of a glass sheet processing apparatus in accordance with the present invention.

There is shown in FIG. 1 a glass sheet processing apparatus 11 which includes a continuous conveyor system 12 for supporting a plurality of sheets of glass 13 for movement in a generally horizontal plane. The conveyor system 12 moves the sheets 13 through a heating station 14 including a furnace 15 for heating the sheets to their softening point or bending temperature. The conveyor system 12 also extends through a bending station 16 for bending the heated sheets 13 to the desired curvature. Not shown is a conventional tempering station having a chilling means for rapidly reducing the temperature of the reheated sheets to produce the desired temper in the bent glass after bending.

The furnace 15 is of the tunnel type having a pair of side walls 17 (only one is shown), a top wall 18, a bottom wall 19, an entrance end wall 20 and an exit end wall 21 defining a heating chamber 22. The heating chamber 22 can be heated in any desired manner by suitable heating means, such as gas burners or electrical resistance elements (not shown) located in the top and side walls of the furnace 15. Such heating means are suitably controlled by conventional means (not shown) to obtain the desired temperature at various points in the heating chamber 22.

The conveyor 12 is formed from a plurality of conveyor sections to continuously convey the sheets 13 in the direction of an arrow 23 through the heating station 14 and the bending station 16. A plurality of the sheets 13 are individually loaded on and supported in a generally horizontal plane on longitudinally spaced conveyor rolls 24 of a first supply conveyor 25. Any of a number of conventional aligning devices (not shown) can be utilized to properly align the sheets 13 for the trip through the heating station 14 and the bending station 16.

The supply conveyor 25 delivers the sheets 13 to a speed-up conveyor section 26 adjacent the entrance end wall 20 of the furnace 15. The speed-up conveyor 26 extends up to an entrance opening 27 formed in the entrance end wall 20. A second speed-up conveyor 28, located inside the furnace 15, extends from the opening 27 to a conveyor section 29 extending through a central portion of the chamber 22. Next, the sheets 13 are moved through a transfer section which is defined by two speed-up conveyors 30 and 31. The conveyor 31 extends to an exit opening 32 formed in the exit end wall 21. Adjacent the exit opening 32, outside the furnace 15, is a bending conveyor section 33 which transfers the sheets 13 through the bending station 16. Finally, the sheets 13 are transferred to a tempering station conveyor section 34 which delivers the sheets to the tempering station (not shown).

The rate of movement of the sheets 13 along the conveyor system 12 is controlled by a motor controller 35. Each of the conveyor sections can be controlled separately with respect to the speed of the sheets 13 such that when the sheets are delivered by the supply conveyor 25, the rate of processing can be speeded up by the speed-up conveyor sections 26 and 28, and the sheets 13 will pass through the central portion of the chamber 22 at a rate determined by the conveyor section 29. The rate of movement of the sheets 13 can then again be increased by the speed-up sections 30 and 31 for delivery to the bending station 16. The sheets are moved through the bending station 16 by the conveyor section 33 generally at a faster speed than through the furnace 15 to reduce the minimum heat losses occurring during this transfer. The conveyor section 34 generally operates at a slower rate than the bending station conveyor section 33 to assure adequate exposure of the sheets to the cooling medium.

The conveyor section 26 includes a plurality of the rollers 24 which are journalled at their opposite ends in bearing blocks (not shown) located on opposite sides of the conveyor system 12. The conveyor rolls 24 of the conveyor section 26 are driven in common, via an endless drive chain 36 from a suitable gear reduction mechanism 37 coupled to a variable speed power source or electric motor 38. Likewise, the speed-up conveyor section 28 has a plurality of the rollers 24 driven by an endless drive chain 39 from a gear reduction mechanism 40 coupled to a motor 41. Similarly, the conveyor rolls 24 of the conveyor section 29 are driven by a drive chain 42 from a gear reduction mechanism 43 coupled to a motor 44; of the conveyor section 30 are driven by a chain 45 from a gear reduction mechanism 46 coupled to a motor 47; of the conveyor section 31 are driven by a drive chain 48 from a gear reduction mechanism 49 coupled to a motor 50; of the conveyor section 33 are driven by a chain 51 from a gear reduction mechanism 52 coupled to a motor 53; and of the conveyor section 34 are driven by a chain 54 from a gear reduction mechanism 55 coupled to a motor 56. The variable speed electric motors 38, 41, 44, 47, 50, 53 and 56 are all operatively connected to the motor controller 35 by control lines 57, 58, 59, 60, 61, 62 and 63 respectively. Thus, once the rates of speed of each of the conveyor sections has been established, the motor controller 35 can adjust the speed of each of the motors proportionally in response to a change in speed of any one of the conveyor sections.

The bending station 16 includes an upper male mold member 64 and a lower female mold member 65 having opposed complemental shaping surfaces conforming in curvature to the shape of the sheets when bent and which are mounted for relative movement toward and away from each other. The male mold member 64 has a downwardly directed, generally convex shaping surface 66 and is mounted above the rolls 24, while the female mold member 65 is located below the conveyor rolls 24 and mounted for vertical movement toward and away from the male mold member 64. To permit displacement of the female mold member 65 above the level of the conveyor rolls 24 for lifting the sheets 13 thereabove, such member is formed of a plurality of segments 67 mounted on a carriage 68 and spaced apart a sufficient distance to allow the segments 67 to pass between adjacent rolls 24. The segments 67 form a composite, ring-type structure having a generally concave shaping surface 69 complimentary to the shaping surface 66 of the male mold member 64.

The carriage 68 is vertically moveable by a fluid actuator 70 having a suitable piston rod 71 for raising and lowering the attached female mold member 65. The mold member 65 is moved between a lower position below the conveyor rolls 24 and an upper position thereabove. The mold member 65 moves a heated glass sheet 13 from the conveyor rolls 24 and presses the same against the male mold member 64 between the complemental shaping surfaces 66 and 69, thus forming the glass sheet into the desired curvature. The male mold member 64 also can be mounted for vertical movement, if desired, by suspending the same from a piston rod 72 of a fluid actuator 73.

The temperature of each of the glass sheets immediately prior to the first processing step is the most critical factor in attaining the desired degree of uniformity of shape and temper in the glass sheets processed in accordance with the above described press bending operation. For example, the sheets must be heated to a temperature level rendering them sufficiently pliable to impart the desired shape thereto when bending and to retain adequate heat for subsequent tempering, and yet not overheated to the extent that deformation control will be lost whereby, after bending, the sheets will sag out of the desired shape and also be vulnerable to marking and further distortion by the conveyor rolls.

While the optimum temperature range at which the heated sheets should be processed can be readily calculated and/or determined by experimentation, difficulties have been encountered in consistently obtaining this optimum temperature range for a multiplicity of successively heated sheets. This is due to a number of factors, including the degree of loading of the furnace, thermal currents within the furnace, and variations in the output temperature of the several gas fired burners or electrical resistent elements for example, because of fluctuations in the heat value in the fluid of the fuel supply or the resistance encountered by the electrical power input, respectively. If the glass sheets 13 are all of the same type, the desired optimum glass temperature can be obtained by automatically adjusting the speed of the conveyor sections within the heating furnace 15 for increasing or decreasing exposure time of the sheets to heat in accordance with temperature deviations from the desired temperature noted in the sheets exiting the furnace. When the measured temperature falls below the desired value, the speeds of the conveyor sections are decreased to increase overall heat exposure time of successive sheets being conveyed therethrough and conversely, where the measured temperature is greater than the desired value, the speeds of the conveyor sections are increased to decrease the heat exposure time. Such a control system is shown in U.S. Pat. No. 4,071,344.

However, additional problems are created when bending glass for laminated products and/or products having large curvatures over small distances. For example, it is more efficient and a better product results when two sheets of glass which are to be nested together in a windshield are processed one after the other as they are carried along by the conveyor system. Often, the two sheets of glass are of different thicknesses and may also be of different compositions. Furthermore, it is desirable to heat localized areas of a sheet of glass to higher temperatures in order to properly form highly curved surfaces where, for example, the glass is of the automotive wrap-around type.

The present invention provides a means for heating and bending different sheets of glass together on a production basis. In FIG. 1, one or more conventional sensors 74 are positioned adjacent the conveyor sections 25 and 26 for sensing identifying parameters of the glass sheets 13. The sensor 74 is shown as being connected to generate a sensor signal to a timer 75 over a line 76. The sensor 74 can represent, for example, a thickness sensor which generates a sensor signal indicating which of two thicknesses of glass sheets is about to enter the furnace 15. The timer 75 can be set to respond to the thickness signal received on the line 76 to generate a bending station indexing actuation signal on a line 77 to a motor 78. The motor 78 is coupled to an indexing system 79, which will be explained in more detail in connection with FIGS. 2 and 3. The indexing system 79 moves the upper mold member 64 between an upper position to provide less pressure for shaping and reducing the cross bend in the thinner sheets of glass 13, and a lower position to apply more pressure to the thicker glass sheets. The indexing mechanism 79 can be mounted on an upwardly facing surface of the upper mold member 64. The timer 75 can also generate a speed control signal on a line 80 to the controller 35. The controller 35 can then regulate the speed of the conveyors 28, 29, 30 and 31 to vary the speed of the sheets of glass 13 through the furnace 15 for more or less heat depending upon the thickness of the glass.

The present invention also provides means for generating differential heat, that is varying the amount of heat imparted to a desired area of the sheets of glass 13. The furnace 15 is typically divided into heating zones each with its own temperature control system (not shown). However, such a furnace is incapable of putting differential heat in specific areas of a glass sheet. As shown in FIG. 1, a plug wall 81 extends downwardly from the inner surface of the top wall 18 of the furnace 15. If, for example, the furnace 15 has twelve heating zones, the plug wall can be located between zones nine and ten. The plug wall 81 extends across the furnace between the side walls 17. A heating strip assembly 82 is suspended below the top wall 18 and cooperates with the side walls 17, the top wall 18, the exit end wall 21 and the plug wall 81 to form a cavity 83 in the top of the furnace 15. Cooling air is provided to the cavity 83 by an intake blower 84 through a plurality of tubes 85. The air is exhausted from the cavity 83 by a second blower 86 attached to an exhaust tube 87 which extends through the top wall 18 adjacent the exit end wall 21. The intake blower 84 and the exhaust blower 86 provide a slight positive pressure in the cavity 83. The cooling air prevents the ambient air from becoming too hot due to the heating strips 82. Also, a plurality of thermocouples 88, can extend through the top wall 18 of the furnace 15 to measure the ambient temperature of the air in the cavity 83. When the temperature of the air exceeds a predetermined limit, for example 600° F., the top wall 18, which is suspended by a plurality of chains 89, can be raised to allow the heat to escape and reduce the ambient temperature.

In operation, the glass sheets 13 arrive at the entrance to the furnace 15 on the supply conveyor 25. An alignment device (not shown) can be provided to engage a front edge of each sheet and properly align it for travel through the furnace 15. When the aligner releases the sheet 13, it is moved onto a first speed-up conveyor, the conveyer section 26, and delivered to the entrance opening 27 onto a second speed-up conveyor, the conveyor section 28. The two conveyor sections 26 and 28 increase the speed of the glass sheets to approximately one hundred fifty inches per minute which typically is the speed of the conveyor section 29. A third speed-up conveyor section, the conveyor section 30, and a fourth speed-up conveyor section, the conveyor section 31, further increase the speed of the glass sheets 13 through the last portion of the travel in the furnace 15. For example, the sections 30 and 31 can increase the speed from approximately one hundred fifty inches per minute up to a maximum speed such as three thousand inches per minute. However, if the glass sheets 13 are vehicle windshields, the desired maximum speed is in the range of one thousand one hundred to one thousand eight hundred inches per minute. When the glass sheets leave the furnace 15 through the exit opening 32, they move onto the conveyor section 33 which decelerates the speed of the glass sheets to approximately four hundred inches per minute before the sheets hit alignment stops to position them in the bending station 16.

Figure 2:
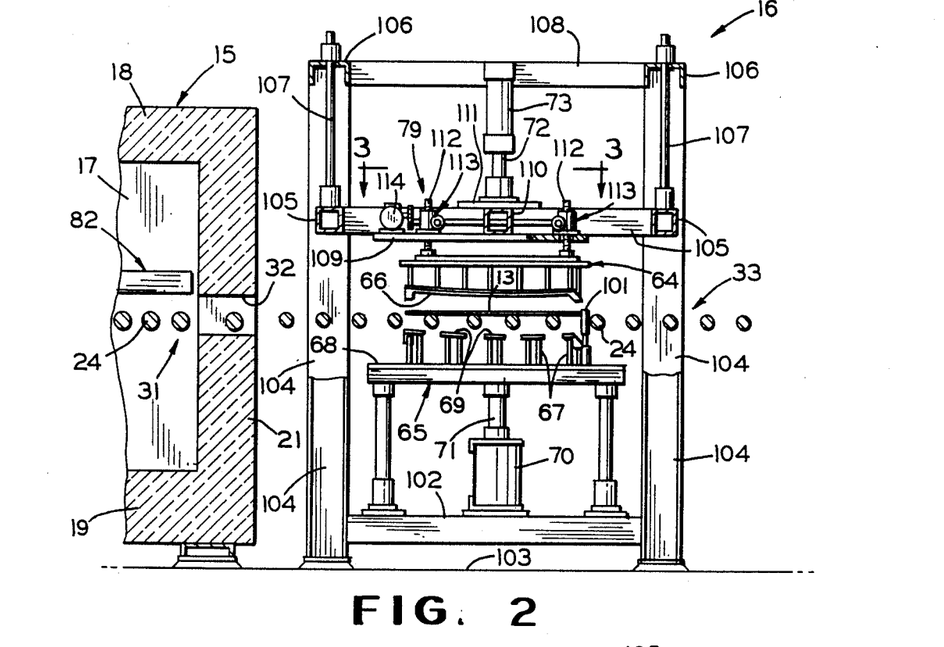
FIG. 2 is a side elevational view of the bending station of the apparatus shown in FIG. 1.

As shown in FIG. 2, a glass sheet 13 rests on the conveyor rolls 24 of the bending conveyor section 33. A leading edge of the glass sheet 13 engages an alignment stop mechanism 101 which extends upwardly from the carriage 68 between a pair of adjacent ones of the conveyor rolls 24. The carriage 68 and the fluid actuator 70 are mounted on a generally horizontally extending support plate 102 which in turn is supported above a surface 103 such as floor of a building by four vertically extending posts 104. A pair of the posts 104 is positioned on each side of the conveyor section 33. When the fluid actuator 70 is actuated, the lower female mold member 65 is moved upwardly to extend the segments 67 between the conveyor rolls 24 such that the concave shaping surface 69 engages the underside of the glass sheet 13.

The indexing system 79 and the upper male mold member 64 are supported by a generally rectangular frame structure formed of four box beams 105. A pair of the box beams 105 extending transverse to the direction of travel of the conveyor system 12 are supported below a pair of generally horizontally extending U-shaped beams 106 by generally vertically extending guides 107. The beams 106 extend between and are attached to the top ends of associated pairs of the posts 104 located on opposite sides of the conveyor. Extending between and attached at opposite ends to the beams 106 is an actuator support beam 108. The fluid actuator 73 is attached to and extends downwardly from the support beam 108. Thus, the fluid actuator 73 moves the upper male mold member 64 and the indexing system 79 downwardly toward the upper surface of the glass sheet 13 to engage the convex shaping surface 66 therewith.

In some laminated windshields, a sheet of relatively thinner glass is laminated to a sheet of generally thicker glass. It is desirable from a production efficiency and quality standpoint to process both types of sheets alternately. However, it is also desirable to apply less pressure for shaping the thinner sheet to reduce the cross bend and provide for better nesting during lamination. Thus, the indexing system 79 is utilized to index the upper male mold member 64 upwardly approximately from its desired position for bending the thicker sheets of glass 13. For a typical windshield, the indexing distance can be 0.040 inches.

Figure 3:
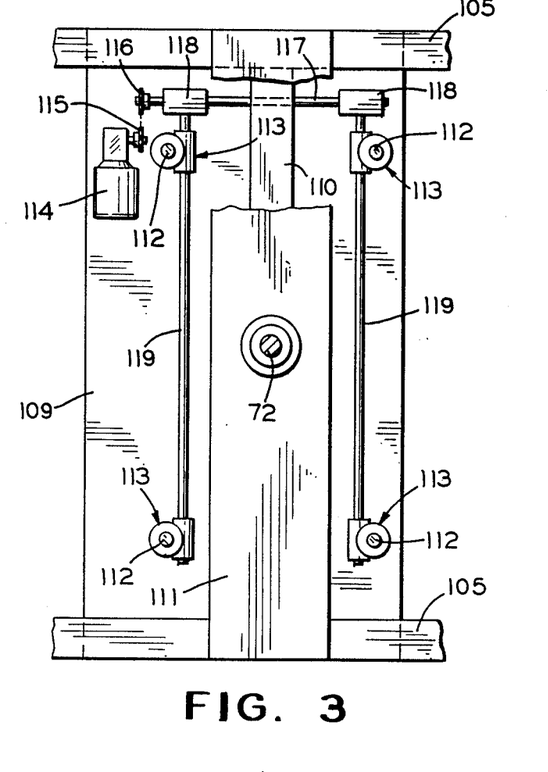
FIG. 3 is a cross sectional view of the bending station taken along the line 3—3 in FIG. 2.

Referring to FIG. 2 and FIG. 3, an indexing support plate 109 extends horizontally below the box beams 105 and is attached at opposite ends to the pair of the box beams 105 which extend generally in the direction of travel of the conveyor system. A fifth box beam 110 is attached to the upper surface of the plate 109 and is also attached at opposite ends to the same pair of the box beams 105. The lower end of the piston rod 72 is attached to another support plate 111 which extends between the same pair of box beams 105 and is attached at opposite ends to those box beams and to the upper surface of the box beam 110. Four threaded shafts 112 extend downwardly through the support plate 109 and are attached at their lower ends to the upper side of the upper male mold member 64. Each of the shafts 112 is an element of a screw jack 113 mounted on the upper surface of the plate 109. The screw jacks 113 are driven in unison by an electric motor 114 mounted on the upper surface of the plate 109. The electric motor 114 drives an output pulley 115 which in turn drives a pulley 116 through a belt (not shown). The pulley 116 is attached to the end of a common drive shaft 117. The drive shaft 117 drives a pair of direction changers 118 which in turn each drive one of a pair of driven shafts 119. Each of the driven shafts 119 drives a pair of the screw jacks 113. Thus, when the motor 114 is actuated, the upper male mold member 64 is raised or lowered by the screw jacks 113 with respect to the support plate 109 to provide less or more pressure respectively for bending the glass sheet 13.

Figure 4:
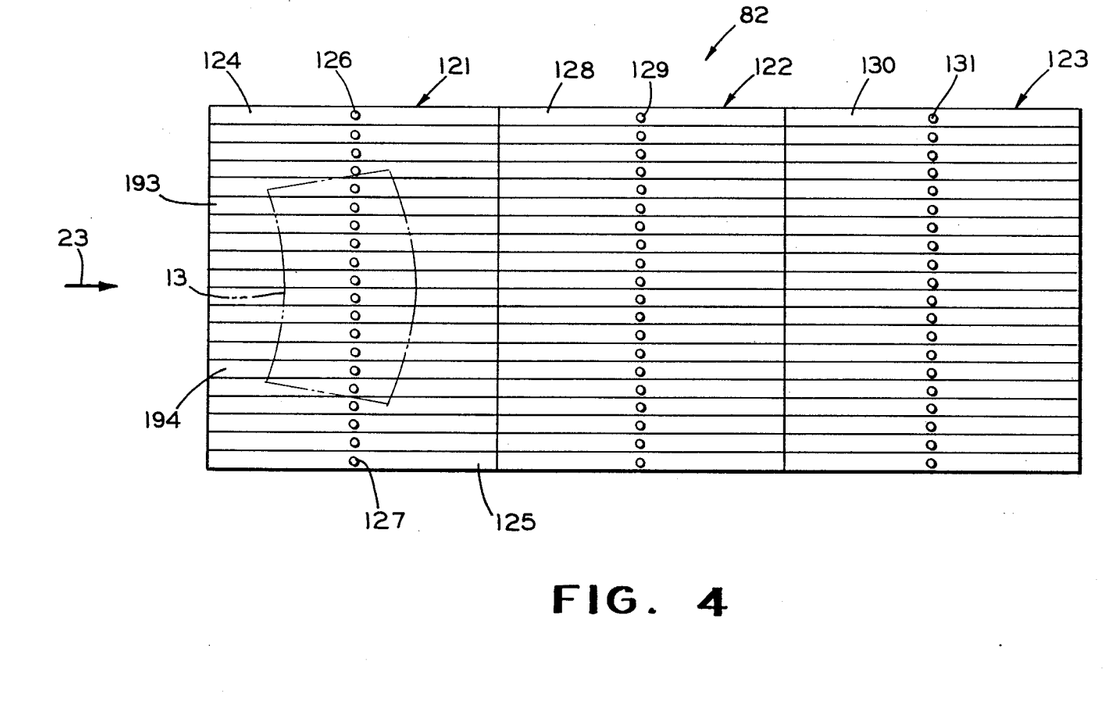
FIG. 4 is a bottom plan view of a strip heater assembly of the apparatus in FIG. 1.

The heating strip assembly 82 is shown in more detail in FIG. 4. The heating strip assembly 82 includes a first section 121 as positioned adjacent the plug wall 81 (not shown). The section 121 is formed of a plurality of heating strips. For example. twenty strips can extend in the direction of the movement of the glass sheets 13 as represented by the arrow 23. A first heating strip 124 is positioned at one edge of the first section 121. Additional strips are positioned side by side and evenly spaced transversely across the width of the section 121 and terminate at the opposite side with a strip 125. Each of the strips can be provided with a conventional form of heating means such as a nickel wire resistance heater. Each of the strips is also provided with a thermocouple such as a thermocouple 126 adjacent the heater strip 124 and a thermocouple 127 adjacent the heater strip 125. The second or center section 122 also includes twenty heater strips such as a heater strip 128 adjacent one edge of the section 122. The heater strip 128 is provided with an associated thermocouple 129 as are all the heater strips in the section 122. Finally, the third section 123 also includes twenty heater strips such the heater strip 130 adjacent the one edge thereof. Each of the heater strips in the section 123 is provided with an associated thermocouple such as the thermocouple 131 associated with the heater strip 130. The typical glass sheet 13 is centered between the heater strips 124 and 125. By regulating the amount of heat provided to each of the heater strips in the section 121, specific areas of the glass sheet 13 can be heated to different temperatures.

Figure 5:
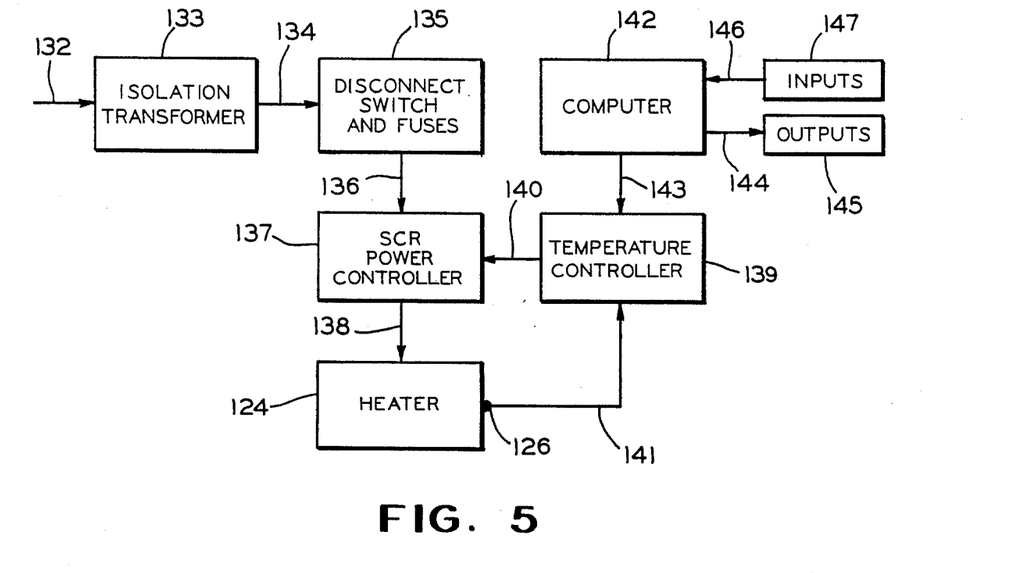
FIG. 5 is a block diagram for one embodiment of a control system for the apparatus shown in FIG. 1.

There is shown in FIG. 5 a control circuit for the differential heating system including the heater strip assembly of FIG. 4. Power from the building power source (not shown) is made available on an input line 132. The line 132 is connected to the input side of an isolation transformer 133 having its output side connected to a line 134. The line 134 is connected to the input of a disconnect switch and circuit protection fuses 135. An output from the switch and fuses 135 is connected by a line 136 to a silicon controlled rectifier (SCR) power controller 137. An output from the controller 137 is connected by a line 138 to an associated one of the heater strips such as the heater strip 124. A temperature controller 139 has an output connected by a line 140 to an input of the power controller 137. The thermocouple 126 associated with the heater 124 is connected by a line 141 to an input of the temperature controller 139. A computer 142 generates a temperature setpoint signal at an output on the line 143 connected to the controller 139. The computer 142 also generates other output signals on lines 144 connected to output devices 145 which include the temperature controllers for the other heating strips. In addition, the computer 142 receives input signals on lines 146 from input devices 147. The output devices 145 and the input devices 146 will be discussed in more detail below.

The temperature controller 139 can be a Eurotherm 808 D1 model temperature controller made by Eurotherm of Reston, Va. A separate one of the temperature controllers 139 is provided for each of the heater strips and the computer 142 can be programmed to generate the setpoint temperature signal for each of the heater strips as required for the differential heating to achieve the shape of the bend to be made in the glass sheet 13. If, for example, sharp bends must be made in opposite sides of the glass sheet 13, one or more of the heater strips located directly above the path of travel of the area to receive the bend would be set for a higher temperature than the heater strips on either side in order to make it easier to make a bend in the glass.

Figure 6:
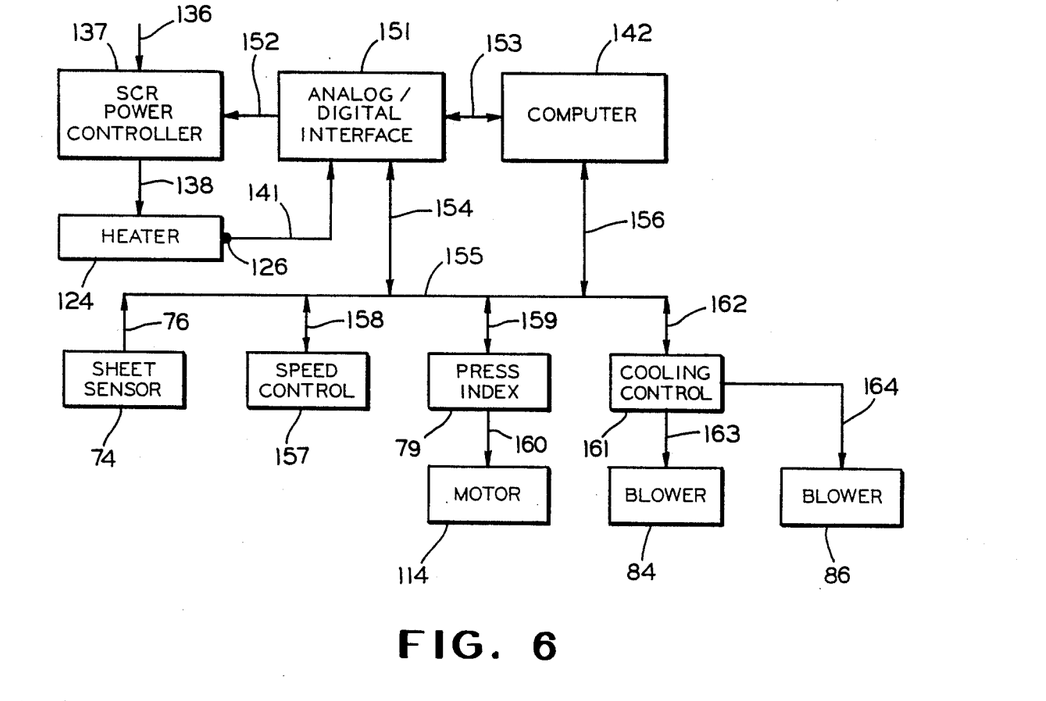
FIG. 6 is a block diagram of an alternate embodiment of a control system for the apparatus shown in FIG. 1.

An alternative differential heating system is shown in FIG. 6. The controller 137 receives power on the line 136 generates power on the line 138 to control the heater 124. The thermocouple 126 sends an actual temperature signal on the line 141 which line is connected to an input of an analog/digital interface 151. The interface 151 has an output connected by a line 152 to the setpoint input of the controller 137. Lines 153 connect inputs and outputs of the computer 142 with outputs and inputs respectively of the interface 151. The temperature controller 139 of FIG. 5 can be implemented in the software associated with the computer 142. In addition, other inputs and outputs of the interface 151 are connected by lines 154 to a bus 155. The lines 153 and 154 represent connections to the other heater strips. Similarly, inputs and outputs of the computer 142 are connected to the bus 155 by lines 156. Also connected to the bus 155, by the line 76, is the sheet sensor 74 for generating the sensor signal. A speed control 157 is connected to the bus by lines 158 for generating actual speed signals and receiving speed setpoint signals. The speed control 157 is representative of the controller 35 in FIG. 1. The press index 79 has inputs and outputs connected to the bus 155 by lines 159 for generating actual position signals and receiving indexing signals. The press index 79 controls the motor 114 by generating an indexing signal over a line 160. A cooling control 161 has its inputs and outputs connected to the bus 155 by lines 162 for generating a high temperature signal and receiving control signals. The cooling control 161 controls the operation of the blowers 84 and 86 over lines 163 and 164 respectively. The sheet sensor 74, the speed control 157, the press index 79 and the cooling control 161 represent the output devices 145 and the input devices 147 of FIG. 5.

Figure 7:
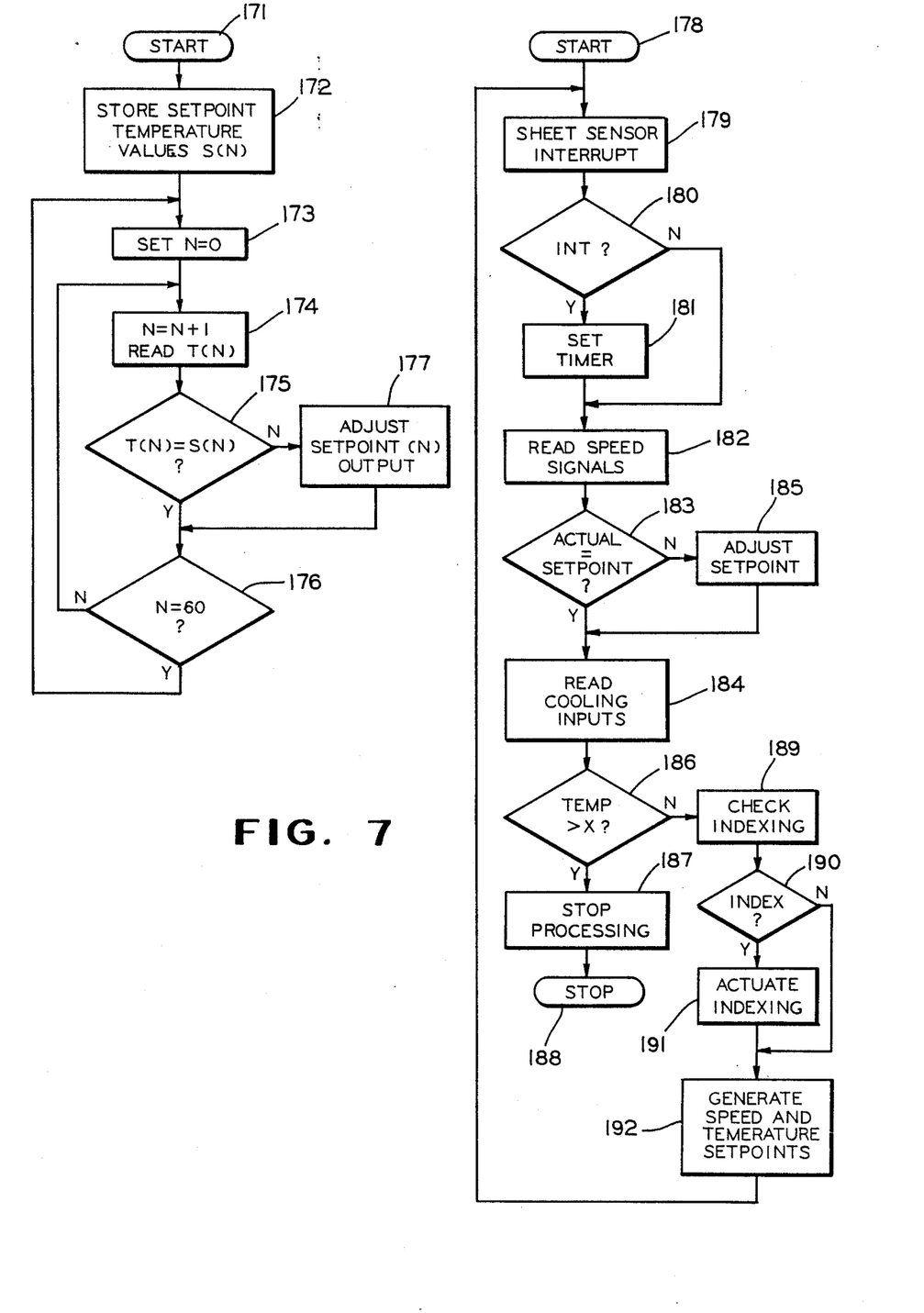
FIG. 7 is a flow diagram of the process carried out by the present invention.

There is shown in FIG. 7 a flow diagram for operating the differential heating systems of FIG. 5 and FIG. 6. A control program starts at a point 171 and enters an instruction set 172 wherein the program stores the setpoint temperature values "S(N)" for each of the heaters 124. The program enters an instruction set 173 where the heater identification variable "N" is set to zero. The program then enters an instruction set 174 wherein the present value of "N" is incremented by one and the temperature "T(N)" of the associated heater 124 is read from the associated thermocouple 126. The program enters a decision point 175 wherein the actual temperature signal value "T(N)" is compared with the setpoint temperature signal value "S(N)". If the temperature values correspond, the program branches at yes "Y" to a second decision point 176. In the decision point 176, the program checks to see whether all of the temperature values have been checked "N=60?". If all the values have been checked, the program branches at yes "Y" back to the instruction set 173 where the process is repeated. If not all of the values have been checked, the program branches at no "N" back to the instruction set 174 where the value of "N" is incremented by one. If the actual temperature signal value "T(N)" is not equal to the setpoint temperature signal value "S(N)", then the program branches from the decision point 175 at no "N" to an instruction set 177. The program adjusts an output signal for the setpoint "N" in a manner which will tend to drive the actual temperature of the heater 124 as measured by thermocouple 126 toward the desired setpoint temperature value. The program then returns to the input of the decision point 176. The flow diagram represented by the symbols 171 through 177 can be programmed in the computer 142 of FIG. 5 for generating temperature setpoint signals on the line 143 to the temperature controller 139 associated with the heater 124 and the lines 144 associated with the other temperature controllers. The flow diagram can also be implemented in the computer 142 of FIG. 6 for generating control signals on the lines 153 to the analog/digital interface 151 to control the heaters 124.

The computer 142 in FIG. 6 can also be programmed to interact with the devices attached to the bus 155. For example, the program can start at starting point 178 and enter an instruction set 179 to check for a sensor signal from the sheet sensor 74. The program enters a decision point 180 and determines whether the signal from the sheet sensor 74 is an interrupt "INT ?" which indicates that the glass sheet that is being detected is different from the last glass sheet that was detected. If the sheets are different, the program branches at yes "Y" to an instruction set 181 where a timer is set. If the answer is no "N", the program branches around the instruction set 181. The program continues from the instruction set 181 or from the no branch to an instruction set 182 wherein the program reads the actual speed signals representing the speed of the various conveyor sections.

The program exits from the instruction set 182 to a decision point 183 to compare the actual speed signal with a speed setpoint signal for the conveyor system. If the actual speed equals the setpoint speed, the program branches at yes "Y" to an instruction set 184. If the actual speed does not equal the setpoint speed, the program branches from the decision point 183 at no "N" to an instruction set 185 wherein the setpoint is adjusted to drive the actual speed toward the desired value. The program exits the instruction set 185 to the instruction set 184 wherein temperature signals from the cooling system are read. The program then enters a decision point 186 wherein the actual temperature in the cavity 83 is compared with a maximum temperature "X". If the maximum temperature has been exceeded, the program branches at yes "Y" to an instruction set 187 wherein the processing of the glass sheets is stopped and the program then enters a stop point 188.

If the maximum temperature in the cavity 83 has not been exceeded, the program branches from the decision point 186 at no "N" to an instruction set 189 wherein a check is made of the press index 79. The program enters a decision point 190 from the instruction set 189 to determine whether indexing is required at the bending station 16. If the timer set in the instruction set 181 has timed out, and the indexing system 79 is set for another type of glass sheet, then the program branches at yes "Y" to an instruction set 191 wherein the indexing system 79 is actuated. The program then enters an instruction set 192. If either the timer has not timed out or the indexing system is set for the approaching sheet of glass, the program will branch from the decision point 190 at no "N" and enter the instruction set 192 directly. The instruction set 192 controls the computer for generating the speed and temperature setpoint signals to control the conveyor section motor speed controller and the heaters respectively. The program then branches back to the instruction set 179.

Although the program for the computer 142 has been shown in one form in FIG. 7, it can be implemented in several different forms. The important consideration is that the actual temperature signal input from the thermocouple 126, the sensor signal from the sheet sensor 74, the actual speed signals from the speed control 157, the position signal from the press index 79, and the high temperature signal from the cooling control 161 be read periodically and the outputs to control the various devices be generated as required. Obviously, the speed and temperature setpoint values for various types of glass sheets can be stored in the computer. Referring to FIG. 4, the glass sheet 13 may require significant bending in areas which are heated by a pair of strips 193 and 194 adjacent side edges of the glass sheet 13. Thus, the computer 142 would store a pair of setpoint values for the heater strips 193 and 194 for one glass sheet of a pair of glass sheets to be laminated and store another set of setpoint values for the heater strips 193 and 194 for the other one of the glass sheets which may vary in thickness and/or composition from the one glass sheet. The sheet sensor 74 would detect identifying parameters indicative of the type of glass sheet entering the furnace and signal the computer to change the setpoint values for the heater strips 193 and 194 at an appropriate time corresponding to the travel of the glass sheet through the furnace in order to differentially heat the glass sheet and improve the bending operation and the final fit in the laminated structure. Furthermore, the computer can store different sets of speed setpoint values for the conveyor section speeds to also accomplish differential heating between successive glass sheets by adjusting the travel time through the furnace.

In accordance with the provisions of the patent statutes. the present invention has been described in what is considered to represent its preferred embodiment. However, it should be noted that the invention can be practiced otherwise than as specifically illustrated and described without departing from its spirit or scope.

What is claimed is:

1. In an apparatus for processing glass sheets including a furnace and a conveyor for transporting glass sheets through the furnace, an improved differential heating system comprising:

the plurality of heating means mounted in a furnace for heating associated areas of glass sheets being transported through the furnace on the conveyor;

means for generating actual temperature signals representing the actual temperature values of each of said heating means; and means for generating temperature setpoint signals representing desired temperature values for each of said heating means;

means connected to said heating means and to both said means for generating and responsive to said actual temperature signals and said temperature setpoint signals for controlling a heat output of each of said heating means; and means for sensing at least one identifying parameter indicative of the type of sheet of glass being transported by the conveyor and connected to said means for generating said temperature setpoint signals for changing a value at least one of said temperature setpoint signals based upon the sensed at least one identifying parameter.

2. The differential heating system according to claim 1 wherein said plurality of heating means include electrical resistance heating strips extending longitudinally in a direction of travel of the glass sheets along the conveyor and positioned side by side extending transverse to the direction of travel of the conveyor.

3. The differential heating system according to claim 1 wherein said means for generating actual temperature signals includes a plurality of thermocouples, each of said thermocouples generating one of said actual temperature signals associated with one of said heating means.

4. The differential heating system according to claim 1 wherein said means for generating temperature setpoint signals includes a computer having values for said temperature setpoint signals associated with values at least one identifying corresponding to the sensed parameter stored therein.

5. The differential heating system according to claim 1 wherein said means for controlling includes a plurality of temperature controllers, each of said temperature controllers associated with one of said heating means.

6. The differential heating system according to claim 1 wherein said means for sensing includes a sheet sensor positioned adjacent an entrance to the furnace for the conveyor for sensing said at least one identifying parameter of each sheet of glass entering the furnace.

7. The differential heating system according to claim 6 wherein said sheet sensor comprises means for sensing the thickness of the glass sheet as said at least one identifying parameter.

8. The differential heating system according to claim 6 wherein said sheet sensor comprises means for sensing properties indicative of the composition of the glass sheet as said at least one identifying parameter.

9. The differential heating system according to claim 6 wherein said sheet sensor comprises means for sensing the color of the glass sheet as said at least one identifying parameter.

10. The differential heating system according to claim 6 wherein said sheet sensor comprises means for sensing the shape of the glass sheet as said at least one identifying parameter.

11. In an apparatus for processing glass sheets including a furnace, a bending station, and a conveyor for transporting glass sheets through the furnace and the bending station, an improved differential heating system comprising:
   a plurality of heating means mounted in the furnace for heating associated areas of glass sheets being transported through the furnace on the conveyor;
   means for generating actual temperature signals representing the actual temperature values of each of said heating means;
   means for generating temperature setpoint signals representing desired temperature values for each of said heating means;
   means connected to said heating means and to both said means for generating and responsive to said actual temperature signals and to said temperature setpoint signals for controlling the heat output of said heating means;
   indexing means for adjusting the pressure applied by the bending station to the glass sheets; and
   means for sensing at least one identifying parameter indicative of the type of sheet of glass being transported by the conveyor and connected to said means for generating said temperature setpoint signals and to said indexing means for changing said setpoint values and for actuating said indexing means based upon the sensed at least one parameter.

12. The differential heating system according to claim 11 wherein said bending station includes an upper male mold member and a lower female mold member which engage upper and lower surfaces respectively of the glass sheets in the bending station, and said indexing means adjusts the distance between the upper male mold member and the lower female mold member.

13. The differential heating system according to claim 12 wherein said indexing means includes a plurality of screw jacks attached to the upper male mold member and to a frame of the bending station and coupled to a drive means, said drive means being connected to said means for sensing for moving the upper male mold member with respect to the frame to adjust the distance between the upper and lower mold members.

14. The differential heating system according to claim 11 further comprising means for generating an actual speed signal representing the actual speed of travel of the glass sheet through the furnace, and wherein said means for generating temperature setpoint signals generates at least one speed setpoint signal representing a desired speed of travel of the glass sheet through the furnace and is responsive to the actual speed signal and said speed setpoint signal for changing a value of said speed setpoint signal based upon the value of the sensed at least one parameter.

15. An apparatus for processing glass sheets comprising:
   a furnace for heating glass sheets;
   a conveyor for transporting the glass sheets through said furnace;
   a plurality of heating means mounted in said furnace for heating associated areas of the glass sheets;
   means for generating actual temperature signals representing the actual temperature values of each of said heating means;
   means for generating temperature setpoint signals representing desired temperature values for each of said heating means;
   means for generating an actual speed signal representing the actual speed value of the glass sheets being transported along a section of said conveyor;
   means for generating a speed setpoint signal representing the desired speed value for said conveyor section;
   means for sensing at least one identifying parameter indicative of the type of sheet of glass being transported by said conveyor and for generating a sensor signal representing a value of the sensed at least one identifying parameter; and
   means connected to all said means for generating and to said means for sensing and responsive to said actual temperature signals, said actual speed signal, said temperature setpoint signals, said speed setpoint signal, and said sensor signal for changing values of said temperature setpoint signals and said speed setpoint signal based upon the value of said sensor signal.

16. The apparatus according to claim 15 including a bending station for shaping the heated glass sheets, said conveyor extending from said furnace through said bending station, said bending station including a pair of opposed mold members and means for indexing said pair of molds, said means for indexing being connected to said means for changing, said means for changing being responsive to said sensor signal for generating an indexing signal to actuate said means for indexing to move said mold members with respect to one another to vary the pressure applied to the glass sheets based upon the value of said sensor signal.

17. The apparatus according to claim 16 wherein said means for sensing comprises means for sensing the thickness of the glass sheets as said at least one identifying parameter.

18. The apparatus according to claim 15 wherein said means for sensing comprises means for sensing at least two identifying parameters of a sheet of glass being transported by said conveyor and generates a sensor signal for each of said identifying parameters, said identifying parameters including the thickness of the glass sheet and the color of the glass sheet.

19. The apparatus according to claim 15 including means for generating a high temperature signal representing the temperature value of ambient air adjacent said heating means and wherein said means for changing is connected to said means for generating said high temperature signal for shutting off said heating means and stopping the processing of the glass sheets.

20. The apparatus according to claim 15 wherein said means for generating an actual speed signal generates a plurality of actual speed signals each representing the actual speed value of the glass sheets being transported along an associated section of said conveyor and wherein said means for generating a speed set point signal generates a plurality of speed set point signals each representing the desired speed value for an associated one of said conveyor sections.

* * * * *